(12) United States Patent
Usami et al.

(10) Patent No.: US 8,374,067 B2
(45) Date of Patent: Feb. 12, 2013

(54) METHOD AND APPARATUS FOR RECORDING INTERFERENCE FRINGE PATTERN

(75) Inventors: Yoshihisa Usami, Ashigarakami-gun (JP); Satoru Yamada, Ashigarakami-gun (JP); Toshio Sasaki, Ashigarakami-gun (JP); Hiroyuki Suzuki, Ashigarakami-gun (JP); Makoto Kamo, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 535 days.

(21) Appl. No.: 12/672,033

(22) PCT Filed: Jun. 6, 2008

(86) PCT No.: PCT/JP2008/001445
§ 371 (c)(1),
(2), (4) Date: Feb. 3, 2010

(87) PCT Pub. No.: WO2009/022444
PCT Pub. Date: Feb. 19, 2009

(65) Prior Publication Data
US 2011/0228656 A1 Sep. 22, 2011

(30) Foreign Application Priority Data

Aug. 16, 2007 (JP) .................................. 2007-212155

(51) Int. Cl.
*G11B 7/00* (2006.01)
(52) U.S. Cl. ....................................................... 369/103
(58) Field of Classification Search ............... 369/44.27, 369/44.28, 103; 359/24
See application file for complete search history.

(56) References Cited

U.S. PATENT DOCUMENTS

| 3,632,214 | A | 1/1972 | Chang et al. |
| 6,882,477 | B1 | 4/2005 | Schattenburg et al. |
| 7,116,626 | B1 | 10/2006 | Woods et al. |
| 7,545,723 | B2 | 6/2009 | Tsukagoshi et al. |
| 7,589,876 | B2 * | 9/2009 | Tsukagoshi et al. ............ 359/24 |
| 7,848,204 | B2 * | 12/2010 | Lan et al. ...................... 369/103 |
| 7,859,970 | B2 * | 12/2010 | Lin et al. ....................... 369/103 |

(Continued)

FOREIGN PATENT DOCUMENTS

| CN | 1845017 A | 10/2006 |
| GB | 2 368 663 B | 7/2003 |
| JP | 2004-177958 A | 6/2004 |

(Continued)

OTHER PUBLICATIONS

Communication pursuant to Article 94(3) EPC, dated May 5, 2011, issued in corresponding EP Application No. 08764042.1, 5 pages.

(Continued)

*Primary Examiner* — Nabil Hindi
(74) *Attorney, Agent, or Firm* — Sughrue Mion, PLLC

(57) ABSTRACT

In order to record an interference fringe pattern in a recording layer of a medium, a plurality of laser beams are caused to interfere so as to form interference fringes in the recording layer; and during a time period over which the plurality of laser beams are caused to interfere, the following steps are continuously performed: (1) producing a signal varying according to a shift of a specific position in the recording layer; and (2) shifting a fringe-forming position in the recording layer by changing a phase of at least one of the laser beams or moving the recording layer based upon the signal produced in the step (1).

13 Claims, 8 Drawing Sheets

U.S. PATENT DOCUMENTS

| | | | |
|---|---|---|---|
| 7,859,974 B2 * | 12/2010 | Tatsuta et al. | 369/103 |
| 2005/0036182 A1 | 2/2005 | Curtis et al. | |
| 2006/0280095 A1 | 12/2006 | Tsukagoshi et al. | |
| 2008/0008076 A1 * | 1/2008 | Raguin et al. | 369/103 |
| 2008/0239921 A1 * | 10/2008 | Tatsuta et al. | 369/103 |
| 2009/0147330 A1 | 6/2009 | Seo et al. | |

FOREIGN PATENT DOCUMENTS

| | | |
|---|---|---|
| JP | 2005-071557 A | 3/2005 |
| JP | 2006-113185 A | 4/2006 |
| JP | 2006-302328 A | 11/2006 |
| WO | 91/01517 A1 | 2/1991 |
| WO | 2005/103842 A2 | 11/2005 |

OTHER PUBLICATIONS

First Office Action, dated May 11, 2011, issued in corresponding CN Application No. 200880102463.1, 22 pages in English and Chinese.

EP Communication, dated Sep. 28, 2010, issued in corresponding EP Application No. 08764042.1, 12 pages.

Mehta et al, "Lasers and Holography," 1993, Word Scientific Publishing, pp. 298, 299, 464, and 465, XP002598881.

Notification of Reasons for Refusal, dated Feb. 7, 2012, issued in corresponding JP Application No. 2007-212155, 9 pages in English and Japanese.

\* cited by examiner

[Fig. 1]
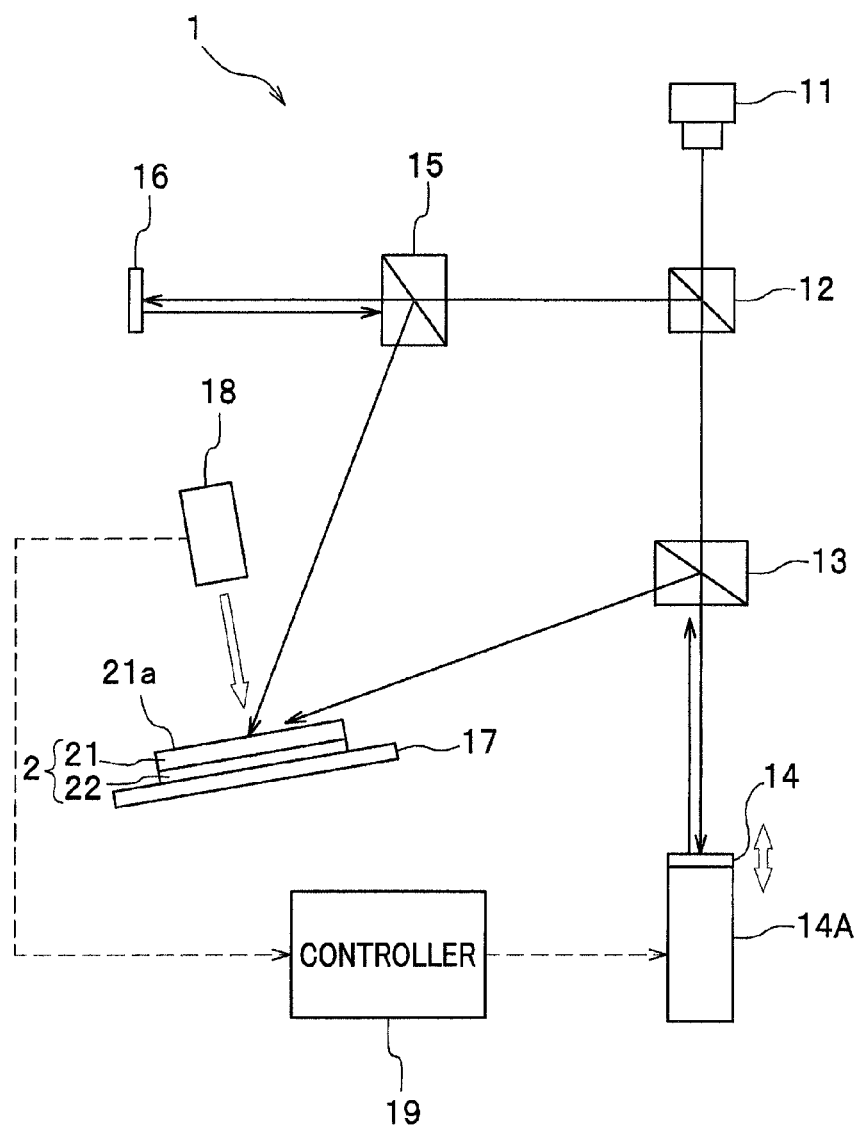

[Fig. 2A]
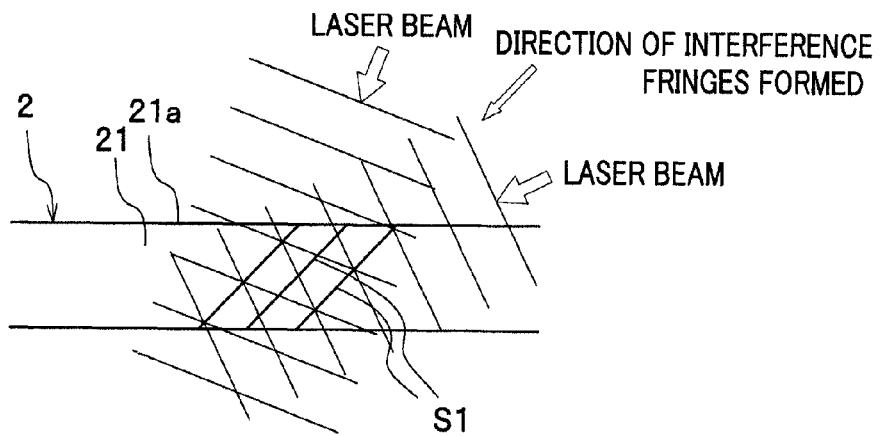
[Fig. 2B]
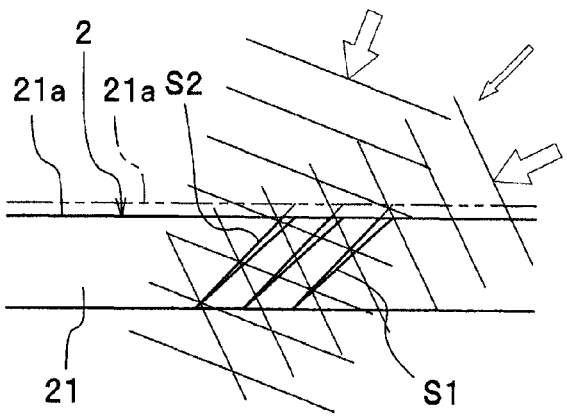
[Fig. 2C]
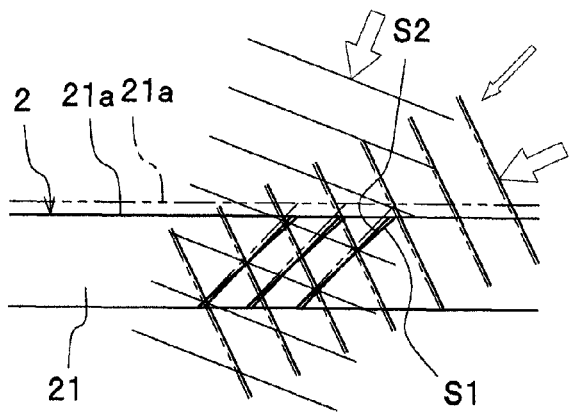

[Fig. 3]
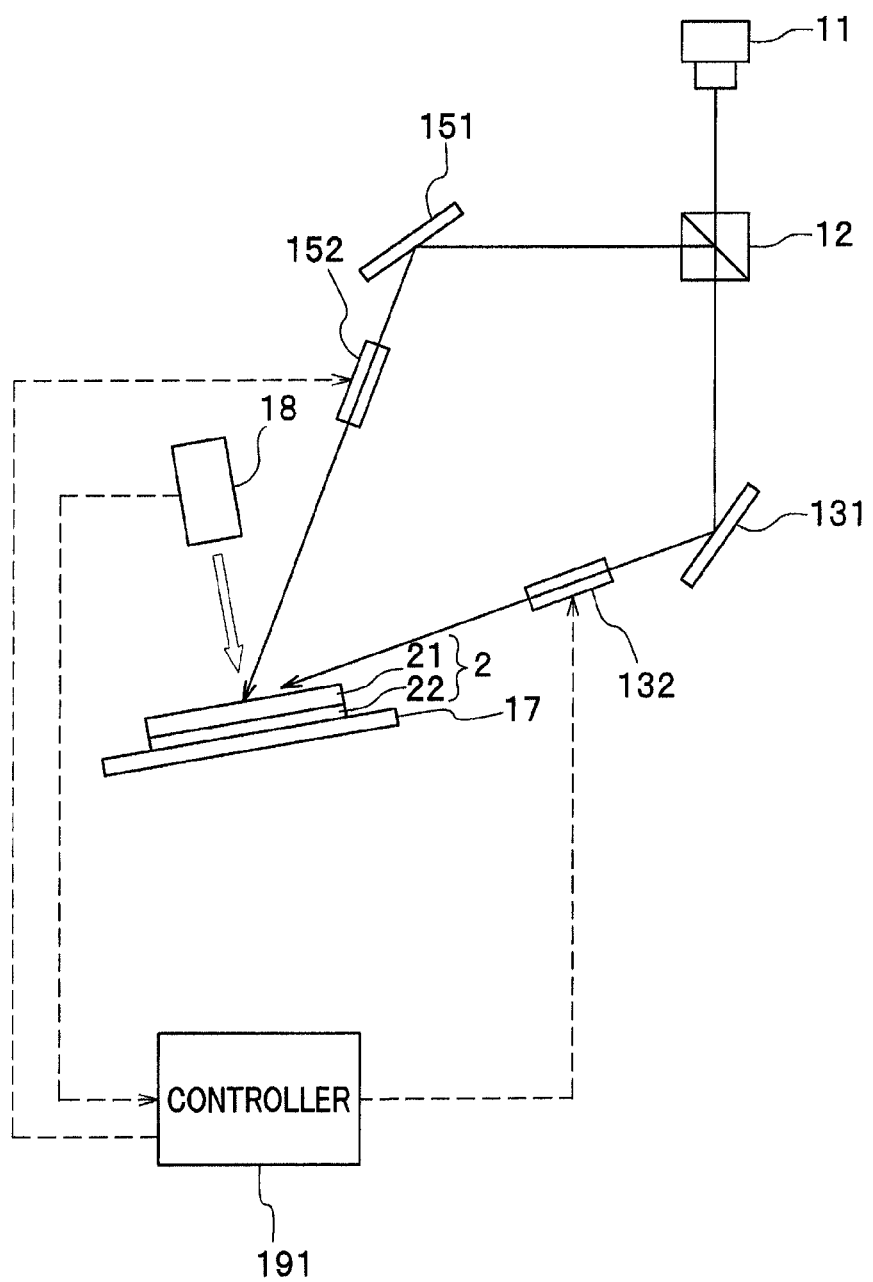

[Fig. 4]
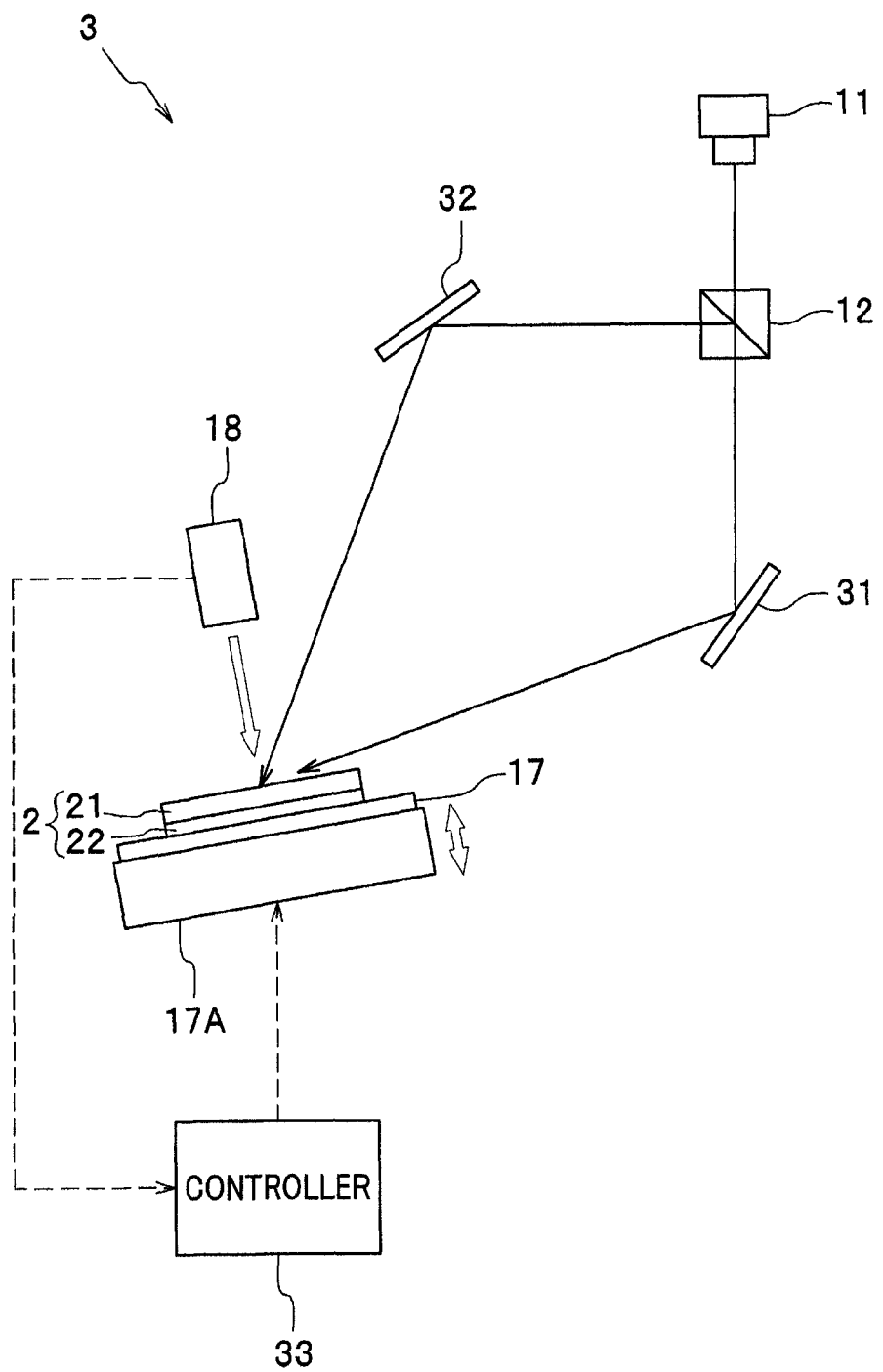

[Fig. 5A]
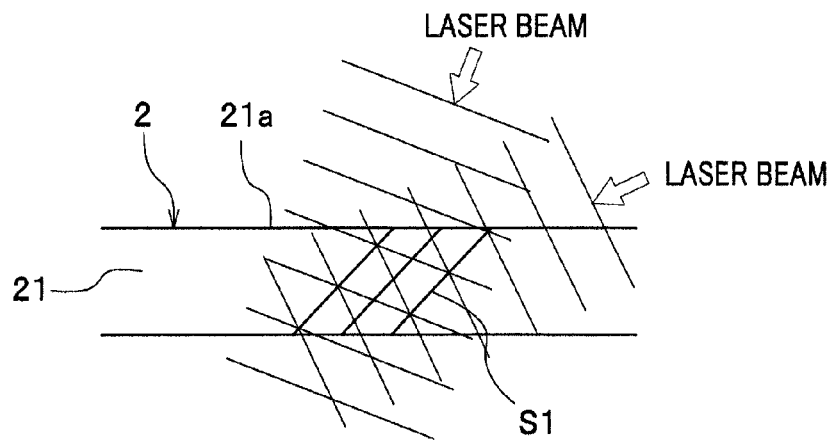
[Fig. 5B]
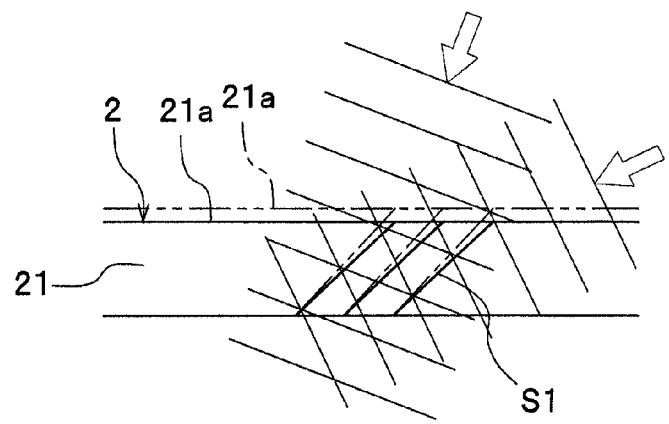
[Fig. 5C]
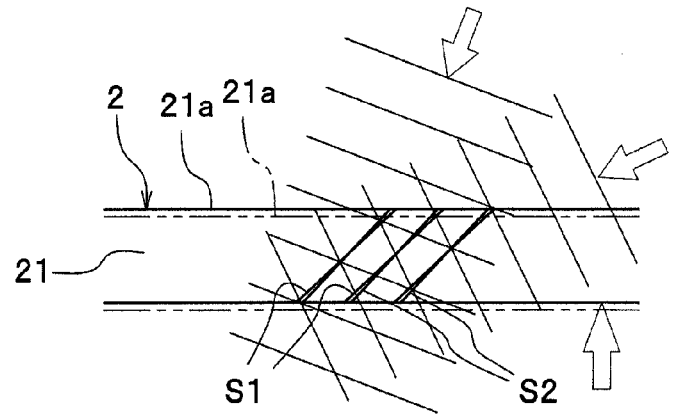

[Fig. 6A]
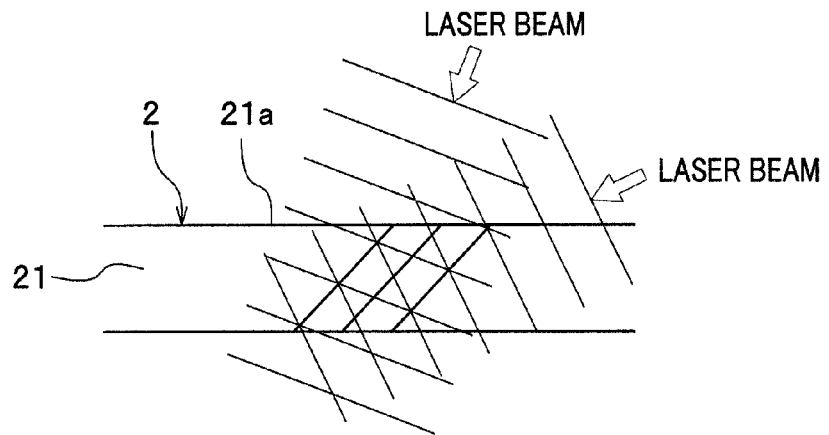
[Fig. 6B]
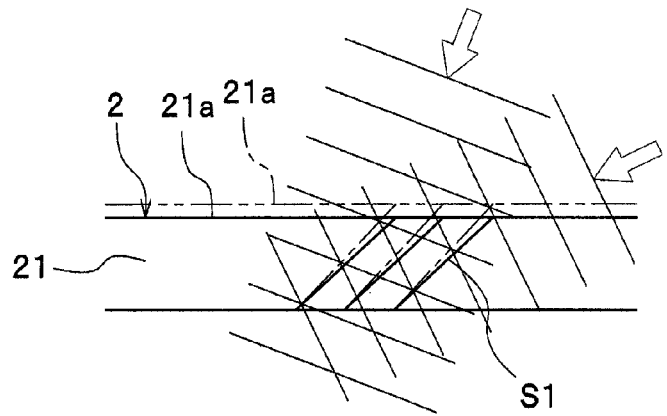
[Fig. 6C]
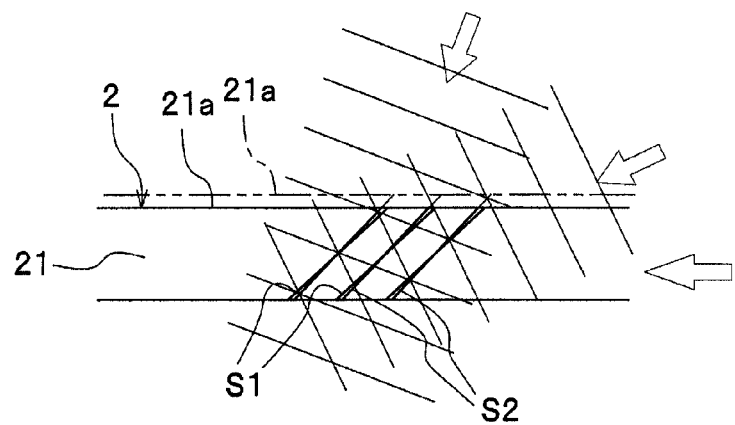

[Fig. 7]
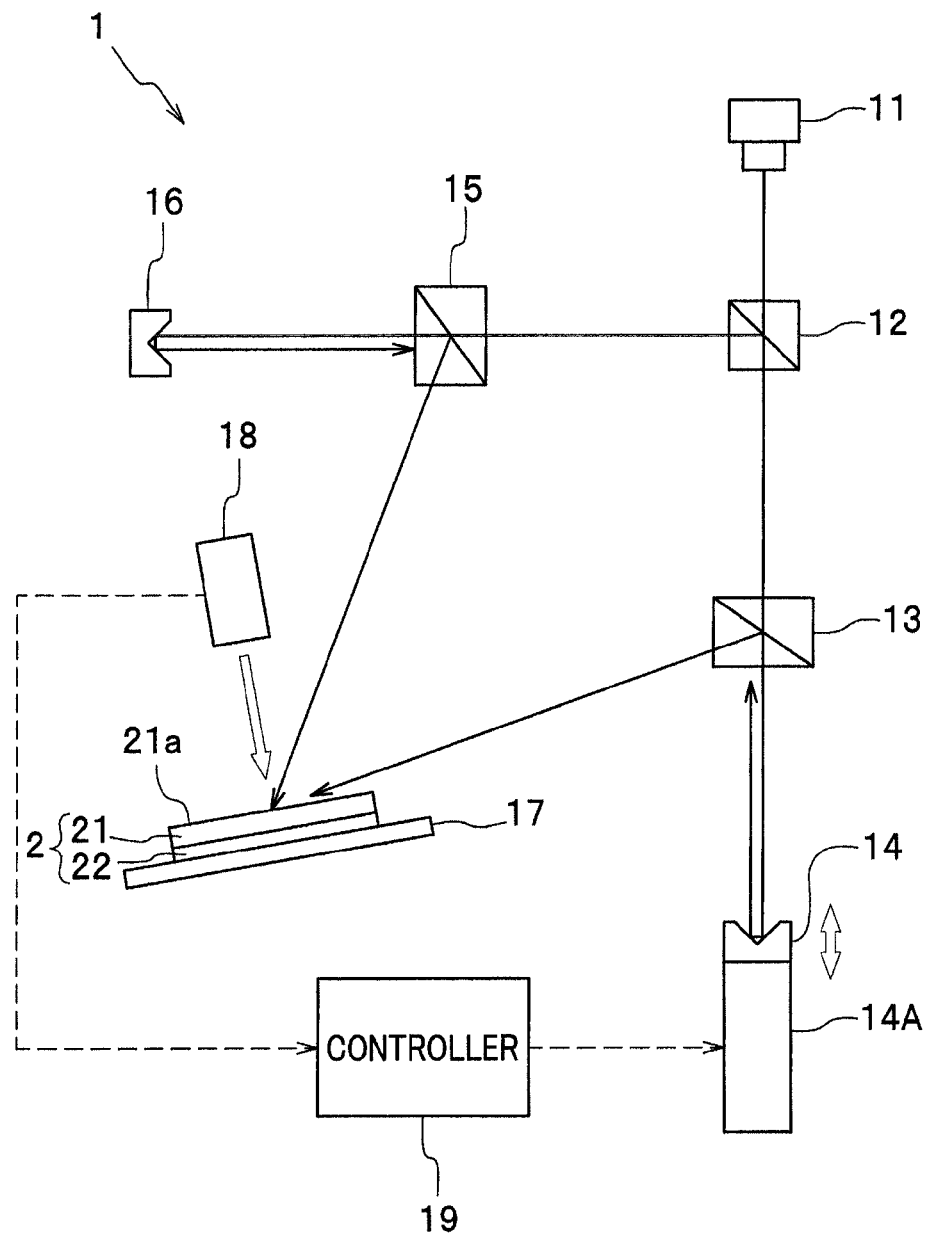

[Fig. 8]
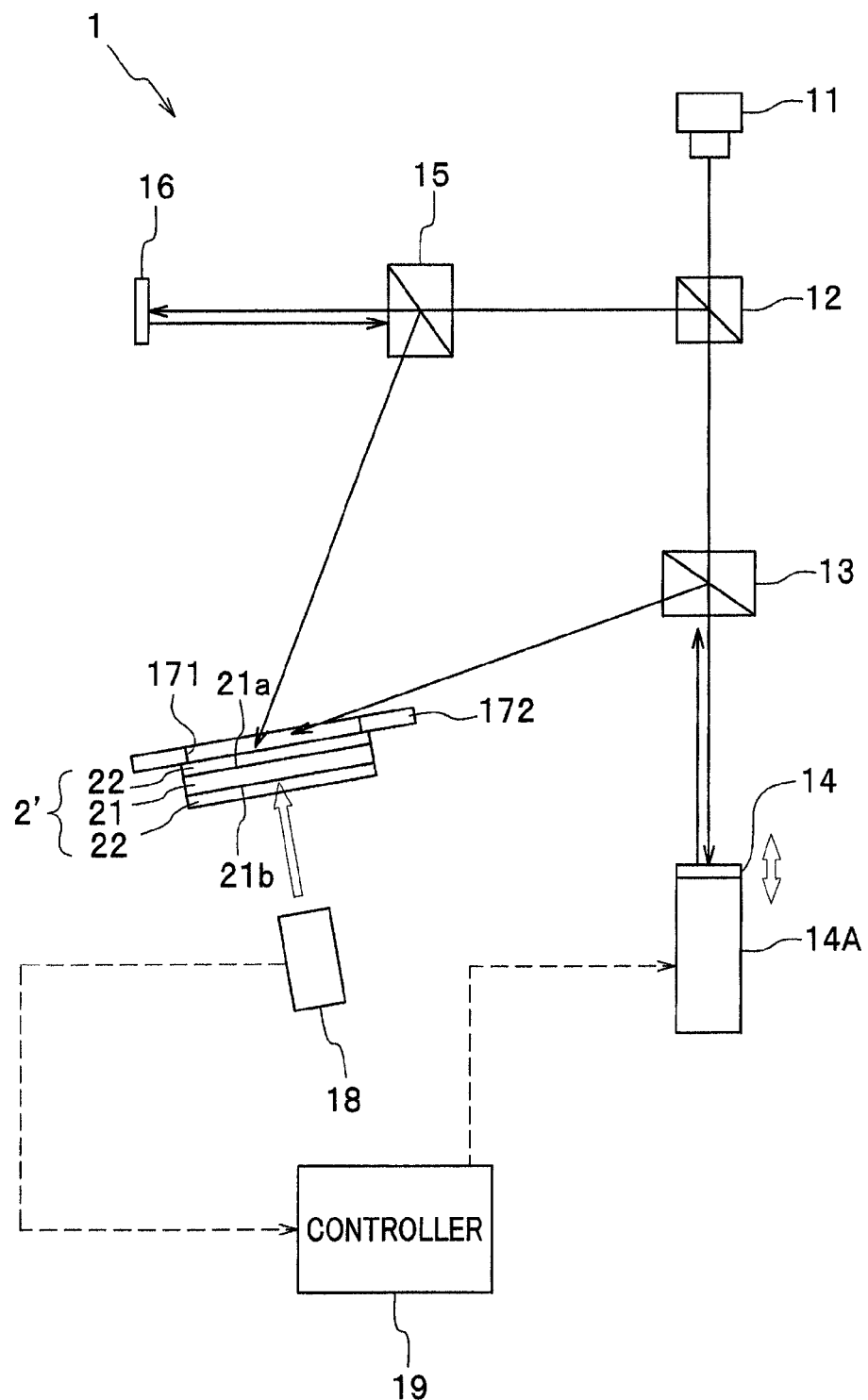

METHOD AND APPARATUS FOR RECORDING INTERFERENCE FRINGE PATTERN

TECHNICAL FIELD

The present invention relates to a method and an apparatus for recording interference fringes or a fringe pattern produced by interference of light waves in a medium, and also to a method for manufacturing a medium in which such an interference fringe pattern is recorded.

BACKGROUND ART

A technique for forming and recording a series of light and dark bands in a photorefractive material such as photopolymer is known in the art in which two plane waves of coherent light are emitted and directed into the material so as to interfere with each other thereby producing interference fringes therein so that the bands of the interference fringes are formed in the material as variation in the intensity of light and retained therein as variation in the refractive index of the material (see JP 2005-071557 A, for example). The interference fringes thus recorded in the material may serve as a diffraction grating, and thus the material (interference fringe medium) in which an interference fringe pattern is recorded may be utilized as an optical element or as an information medium in which information is recorded.

It has however been known that the continuous or continual irradiation of photopolymer as required in the aforementioned conventional technique would shrink the material as a result of photopolymerization of the material, so that the interference fringes would disadvantageously be dislocated.

The present invention has been made in an attempt to eliminate this disadvantage. Illustrative, non-limiting embodiments of the present invention overcome the above disadvantage and other disadvantages not described above. Also, the present invention is not required to overcome the disadvantage described above, and illustrative, non-limiting embodiments of the present invention may not overcome the problem described above.

DISCLOSURE OF INVENTION

It is one aspect of the present invention to provide a method and an apparatus for recording an interference fringe pattern or for manufacturing a medium in which an interference fringe pattern is recorded such that undesirable displacements of the interference fringes which would otherwise take place during the recording operation due to contraction of the recording layer, and associated low contrast or blurs of the resulting interference fringe pattern, can be prevented or suppressed as the amount of such displacements can be significantly reduced or minimized.

More specifically, according to an aspect of the present invention, there is provided a method for recording an interference fringe pattern in a recording layer of a medium. The method comprises: causing a plurality of laser beams to interfere so as to form interference fringes in the recording layer; and performing the following steps continuously during a time period over which the plurality of laser beams are caused to interfere: (1) producing a signal varying according to a shift of a specific position in the recording layer; and (2) shifting a fringe-forming position in the recording layer by changing a phase of at least one of the laser beams or moving the recording layer based upon the signal produced in the step (1).

The step (1) may comprise measuring a surface position of the recording layer, and converting the measurement into the signal. Alternatively, the step (1) may comprise measuring a position of a surface of a layer (e.g., substrate) of the medium provided over a first surface of the recording layer reverse to a second surface thereof fixed relative to an optical system from which the plurality of laser beams are emitted, and converting the measurement into the signal. Also, in one embodiment, the step (1) may comprise measuring a position in the medium varying according to a shift in a surface position of the recording layer, and converting the measurement into the signal. The "position in the medium varying according to a shift in a surface position of the recording layer" may be selected from any positions as long as it can be used to detect any variation in the position of the surface of the recording layer: for example, the surface of one of the substrates between which the recording layer is held, one of the two sides of the recording or other layer in the medium reverse to the side supported and placed in a position fixed relative to the optical system from which the plurality of laser beams are emitted, etc. That is, any position of any layer surface can be used which may shift its position due to the contraction or shrinkage of the recording layer material during the time period over which the plurality of laser beams are caused to interfere in the recording layer.

With these steps, if the recording layer is shrunken during a time period while the plurality of laser beams are caused to interfere in the recording layer so as to form interference fringes, the specific position in the recording layer which is being shifted due to this shrinkage is monitored, directly or indirectly, in the step (1). Then, in the step (2), a fringe-forming position in the recording layer is shifted by changing a phase of at least one of the laser beams or moving the recording layer based upon the signal produced in the step (1). In this way, even if the interference fringes recorded in the recording layer tend to be shifted in position due to contraction of the recording layer material, the fringe-forming position is adjusted so that the displacements of the interference fringes and associated low contrast or blurs of the resulting interference fringe pattern can be suppressed.

The above method for recording an interference fringe pattern may be applied to a method for manufacturing a medium in which an interference fringe pattern is recorded. The medium (hereinafter referred to as "interference fringe medium") as manufactured through this method may include an optical disc or an optical element such as a polarizing plate, for example.

In another aspect of the present invention, there is provided an apparatus for recording an interference fringe pattern in a recording layer of a medium, which apparatus comprises a light source, a beam splitter, a first optical system, a second optical system, a position transducer, and a controller. The light source is configured to emit a laser beam. The beam splitter is configured to split the laser beam emitted from the light source into a plurality of laser beams which comprise a first beam and a second beam. The first optical system is configured to direct the first beam received from the beam splitter into the recording layer by reflecting or transmitting the first beam. The second optical system is configured to direct the second beam received from the beam splitter into the recording layer by reflecting or transmitting the second beam. The position transducer is configured to produce a signal varying according to a shift of a specific position in the recording layer. The controller is configured to carry out control over at least one of the first and second optical systems, to change a phase of at least one of the first and second beams based upon the signal produced by the position transducer, thereby shifting a fringe-forming position in the recording layer.

With this apparatus, if it is determined from the signal produced by the position transducer that the specific position in the recording layer is shifted, the controller controls the first optical system, for example, and changes the phase of the first beam to shift the fringe-forming position. In this way, even if the interference fringes recorded in the recording layer tend to be shifted in position due to contraction of the recording layer material, the fringe-forming position is adjusted so that the displacements of the interference fringes and associated low contrast or blurs of the resulting interference fringe pattern can be suppressed.

In the apparatus as described above, the position transducer may comprise a sensor configured to measure a surface position of the recording layer. Alternatively, the position transducer may comprise a sensor configured to measure a position of a surface of a layer of the medium provided over a first surface of the recording layer reverse to a second surface thereof fixed relative to the apparatus. Also, in one embodiment, the position transducer may comprise a sensor configured to measure a position in the medium varying according to a shift in a surface position of the recording layer.

In the apparatus as described above, the first optical system may comprise a first semitransparent mirror and a first reflector, whereas the second optical system may comprise a second semitransparent mirror and a second reflector. The first semitransparent mirror is configured to transmit the first beam received from the beam splitter. The first reflector is configured to reflect the first beam transmitted through the first semitransparent mirror back onto the first semitransparent mirror, thereby causing the first beam to be reflected off a specular surface of the first semitransparent mirror into the recording layer. The second semitransparent mirror is configured to transmit the second beam received from the beam splitter. The second reflector is configured to reflect the second beam transmitted through the second semitransparent mirror back onto the second semitransparent mirror, thereby causing the second beam to be reflected off a specular surface of the second semitransparent mirror into the recording layer. Moreover, at least one of the first and second optical systems may further comprise a shifter by means of which the first or second reflector is movable in an optical axis direction under control of the controller which is configured to regulate the shifter based upon the signal produced by the position transducer, to change the phase of at least one of the first and second beams, thereby shifting the fringe-forming position in the recording layer.

In the configuration with these additional features, if it is determined from the signal produced by the position transducer that the specific position in the recording layer is shifted, the controller controls the shifter to move the first reflector, for example, and changes the phase of the first beam to shift the fringe-forming position. In this way, even if the interference fringes recorded in the recording layer tend to be shifted in position due to contraction of the recording layer material, the fringe-forming position is adjusted so that the displacements of the interference fringes and associated low contrast or blurs of the resulting interference fringe pattern can be suppressed.

In the apparatus as described above, at least one of the first and second optical systems may comprise a variable refractive index element of which a refractive index is variable according to a voltage applied thereto, and the controller may be configured to regulate the voltage applied to the variable refractive index element based upon the signal produced by the position transducer, to change the phase of at least one of the first and second beams, thereby shifting the fringe-forming position in the recording layer.

In the configuration with these additional features, if it is determined from the signal produced by the position transducer that the specific position in the recording layer is shifted, the controller regulates the voltage applied to the variable refractive index element to vary the refractive index of the variable refractive index element, and changes the phase of at least one of the first and second beams to shift the fringe-forming position. In this way, even if the interference fringes recorded in the recording layer tend to be shifted in position due to contraction of the recording layer material, the fringe-forming position is adjusted so that the displacements of the interference fringes and associated low contrast or blurs of the resulting interference fringe pattern can be suppressed.

According to another exemplary embodiment of the present invention, an apparatus for recording the interference fringe pattern in a recording layer of a medium is provided which comprises: a support stage configured to support the medium; an emitter configured to emit a plurality of laser beams directed into the recording layer; a position transducer configured to produce a signal varying according to a shift of a specific position in the recording layer; a shifter configured to shift the support stage; and a controller configured to carry out control over the shifter to shift the recording layer based upon the signal produced by the position transducer, thereby shifting a fringe-forming position in the recording layer.

In this embodiment, the controller can shift the recording layer supported by the support stage; thus, as is the case with the other configurations described above, even if the interference fringes recorded in the recording layer tend to be shifted in position due to contraction of the recording layer material, the fringe-forming position is adjusted so that the displacements of the interference fringes and associated low contrast or blurs of the resulting interference fringe pattern can be suppressed.

The above aspects, other advantages and further features of the present invention will become more apparent by describing in detail illustrative, non-limiting embodiments thereof with reference to the accompanying drawings.

BRIEF DESCRIPTION OF DRAWINGS

FIG. 1 is a schematic diagram of an optical recording apparatus (apparatus for recording an interference fringe pattern) with a mechanism configured to change a phase of one of laser beams according to an exemplary embodiment of the present invention;

FIG. 2A is a schematic diagram showing a process step of emitting two laser beams to form interference fringes for explaining a method of manufacturing a medium in which an interference fringe pattern is recorded in a recording layer;

FIG. 2B is a schematic diagram showing interference fringes formed after contraction of a recording layer under a conventional scheme;

FIG. 2C is a schematic diagram showing a process step of changing a phase of one of the laser beams by a method according to an exemplary embodiment of the present invention;

FIG. 3 is a schematic diagram of an optical recording apparatus with a mechanism configured to change a phase of one of laser beams according to another exemplary embodiment of the present invention;

FIG. 4 is a schematic diagram of an optical recording apparatus, showing a modified embodiment with a mechanism configured to shift a surface position of a recording layer by moving a support stage;

FIG. 5A is a schematic diagram showing a process step of emitting two laser beams to form interference fringes for explaining a method of manufacturing a medium in which an interference fringe pattern is recorded in a recording layer, by the optical recording apparatus shown in FIG. 4;

FIG. 5B is a schematic diagram showing interference fringes shifted by contraction of a recording layer during a fringe-forming operation;

FIG. 5C is a schematic diagram showing a process step of moving the recording layer to shift a surface position in a thickness direction of the recording layer by a method according to yet another exemplary embodiment of the present invention;

FIG. 6A is a schematic diagram showing a process step of emitting two laser beams to form interference fringes for explaining a method of manufacturing a medium in which an interference fringe pattern is recorded in a recording layer;

FIG. 6B is a schematic diagram showing interference fringes shifted by contraction of a recording layer during a fringe-forming operation;

FIG. 6C is a schematic diagram showing a process step of moving the recording layer to shift a surface position in a direction parallel to the surface of the recording layer by a method according to still another exemplary embodiment of the present invention as modified from the embodiment of FIG. 5C;

FIG. 7 is a schematic diagram of an optical recording apparatus, showing another modified embodiment with L-shaped specular surfaces provided in first and second reflectors of FIG. 1; and FIG. 8 is a schematic diagram of an optical recording apparatus, showing yet another modified embodiment in which a surface position measured by a distance sensor is different from the preceding embodiments.

MODE(S) FOR CARRYING OUT THE INVENTION

Exemplary embodiments of the present invention will be described in detail hereinbelow with reference to the accompanying drawings.

Referring now to FIG. 1, an optical recording apparatus 1 as one example of an apparatus for recording an interference fringe pattern according to an exemplary embodiment of the present invention is an apparatus configured to record interference fringes formed by causing a plurality of laser beams to interfere in an optical recording medium 2 as one example of an interference fringe medium.

The optical recording medium 2 comprises a recording layer 21 and a glass substrate 22.

The recording layer 21 is composed of a material capable of recording interference fringes by reaction induced by radiation of laser beams. To be more specific, fringes formed by interference of signal and reference beams are retained in the recording layer 21. The recording layer 21 consists mainly of a recording material which undergoes reaction (e.g., polymerization) during radiation of beams which causes interference of signal and reference beams so as to form interference fringes, and contracts as the reaction progresses. The material making up the recording layer 21 may be selected, without any limitation, appropriately for its purpose, for example, from: (1) photopolymers that undergo polymerization and become a higher polymer by radiation of light; (2) photorefractive materials that exhibit photorefractive effect (in which the index of refraction can be modulated by a variation in space-charge distribution caused by radiation of light); (3) photochromic materials of which an index of refraction can be modulated by molecular isomerization caused by radiation of light; (4) inorganic materials such as lithium niobate, barium titanate, etc., and (5) charcogen materials.

The glass substrate 22 is a layer which supports the recording layer 21. It is however to be understood that the material for the substrate supporting the recording layer 21 is not limited to glass but may be selected from other materials such as ceramics, resins, etc.

The optical recording apparatus 1 mainly includes a light source 11, a beam splitter 12, a first semitransparent mirror 13, a first reflector 14, a second semitransparent mirror 15, a second reflector 16, a support stage 17, a distance sensor 18 as one example of a device making up a position transducer, and a controller 19.

The light source 11 is configured to emit a laser beam having a predetermined wavelength. The laser beam emitted from the light source 11 is directed to the beam splitter 12.

The beam splitter 12 is composed, for example, of two prisms opposed to each other with a small gap left therebetween. The beam splitter 12 is disposed on an optical axis of the laser beam emitted from the light source 11. The beam splitter 12 is configured to split the laser beam incident from the light source 11 into two beams which includes a first beam (e.g., reference beam) traveling straightforward and a second beam (e.g., signal beam) reflected in a direction perpendicular to the incident laser beam.

The first semitransparent mirror 13 includes a device capable of transmitting at least part of a laser beam received from one direction and reflecting at least part of a laser beam received from another direction. The first semitransparent mirror 13 is arranged to transmit the first beam, which has been split off in the beam splitter 12 and transmitted therethrough, toward the first reflector 14. The first semitransparent mirror 13 has a specular surface arranged to reflect the laser beam, which has been reflected off the first reflector 14, so that it is directed toward the optical recording medium 2 supported on the support stage 17.

The first reflector 14 includes a mirror capable of reflecting a laser beam. The first reflector 14 is arranged to directly reflect the laser beam, which has been transmitted through the first semitransparent mirror 13, back to the first semitransparent mirror 13. In other words, the first reflector 14 has a specular surface arranged perpendicular to the optical axis of the laser beam which has been transmitted through the first semitransparent mirror 13. The first reflector 14 is supported by an adjustable stage 14A as one example of a shifter by means of which the first reflector 14 is movable in an optical axis direction. Although the laser beam incident on the first reflector 14 and the laser beam reflected off the first reflector 14 are displaced in FIG. 1 for illustration purposes, it is to be understood that the reflected and incident laser beams have a common optical axis in actuality. Note that the same goes for a second reflector 16 which will be described later.

The second semitransparent mirror 15 has the same configuration as that of the first semitransparent mirror 13, and is arranged to transmit the second beam, which has been split off in the beam splitter 12 and reflected thereoff, toward the second reflector 16. The second semitransparent mirror 15 has a specular surface arranged to reflect the laser beam, which has been reflected off the second reflector 16, so that it is directed toward the optical recording medium 2 supported on the support stage 17.

The second reflector 16 includes a mirror capable of reflecting a laser beam. The second reflector 16 is arranged to directly reflect the laser beam, which has been transmitted through the second semitransparent mirror 15, back to the second semitransparent mirror 15. In other words, the second reflector 16 has a specular surface arranged perpendicular to the optical axis of the laser beam which has been transmitted through the second semitransparent mirror 15.

The first semitransparent mirror 13 and first reflector 14 described above make up a first optical system, and the second semitransparent mirror 15 and second reflector 16 described above make up a second optical system.

The support stage 17 includes a stage supporting the optical recording medium 2. The support stage 17 is arranged so that the laser beams reflected off the first and second semitransparent mirrors 13, 15 strike a surface 21a of the optical recording medium 2 at predetermined angles of incidence, respectively.

The distance sensor 18 includes a device for determining a position of the surface 21a (on which the beams strike) of the recording layer 21 of the optical recording medium 2. The distance sensor 18 may be of a type which is configured to measure a distance between the surface 21a of the recording layer 21 and the distance sensor 18 based on the time required for an ultrasonic beam to travel, starting from the launch from the distance sensor 18 toward the surface 21a of the recording layer 21 until the ultrasonic beam reflected off the surface 21a is received by the distance sensor 18. This measurement (distance) is converted into a value (signal) indicative of a surface position of the recording layer 21. In view of the accuracy and simplicity of the mechanism, the distance sensor 18 may preferably but not necessarily be selected from the types such as those employed in the Mach-Zehnder interference system and in the confocal system. The signal indicative of the surface position of the recording layer 21 (varying according to a shift in a surface position of the recording layer), which is thus produced in the distance sensor 18, is provided to the controller 19.

The controller 19 is configured to carry out control over the adjustable stage 14A based upon the signal indicative of the surface position of the recording layer 21 produced in the distance sensor 18. To be more specific, the controller 19 regulates the adjustable stage 14A to change the position of the first reflector 14, and change the phase of the first beam (one of the two laser beams striking on the recording layer 21), thereby shifting the fringe-forming position in the recording layer 21. Various methods of controlling the adjustable stage 14A may be applicable; for example, a map representing a relationship between the amount of shift in the surface position obtained from the distance sensor 18 and the amount of shift of the first reflector 14 to be effected by the adjustable stage 14A acquired through experiment and/or simulation in advance is stored in a storage device, so that the amount of regulation of the adjustable stage 14A may be determined from the amount of shift in the surface position based upon the relationship recorded in the map. In this method, the amount of shift in the surface position may be calculated from the current value in the signal (indicative of the surface position) produced by the distance sensor 18 and the previous value in the signal as last received, and the amount of regulation (shift amount) is obtained from the calculated amount of shift in the surface position and data recorded in the map, so that the position of the first reflector 14 may be changed accordingly on an as-needed basis.

The next discussion is directed to a method of manufacturing an optical recording medium 2 by the optical recording apparatus 1 according to the present embodiment, which will now be described with reference to FIGS. 2A, 2B and 2C.

As shown in FIG. 2A, when two laser beams are emitted and directed into the recording layer 21 of the optical recording medium 2 by the optical recording apparatus 1 to cause these laser beams to interfere, an interference fringe pattern 51 is formed along a line which bisects an angle formed between the optical axes of the two laser beams. During a time period over which such an interference fringe pattern 51 is being formed in the recording layer 21, the recording layer 21 contracts in its thickness direction as shown in FIG. 2B as a result of reaction (e.g., polymerization) of the recording material in the recording layer 21. Consequently, the interference fringe pattern 51 formed and recorded at an earlier stage of this time period would disadvantageously become tilted by the time at a later stage of the same time period as shown in FIG. 2B, as compared with its initial position (angle) shown in FIG. 2A.

At this later stage, according to the conventional optical recording apparatus having no phase-changing mechanism, an interference fringe pattern S2 having an angle different from that of the recorded interference fringe pattern S1 would be formed and recorded in the same recording layer 21 as shown in FIG. 2B. Thus, the interference fringe pattern S2 recorded after contraction would be significantly dislocated, particularly at the surface on which the laser beams strike, relative to the interference fringe pattern S1 recorded before contraction.

In contrast, with the aforementioned configuration implemented according to the present embodiment, during the time period over which the two laser beams are caused to interfere, a shift in the surface position of the recording layer 21 caused by contraction of the recording layer 21 is detected and a signal varying according to the shift in the surface position of the recording layer 21 is produced by the distance sensor 18 in step (1). Upon receipt of the signal indicating the shift in the surface position from the distance sensor 18, the controller 19 obtains the amount of a shift to be effected of the first reflector 14 based upon the amount of shift in the surface position indicated by the received signal and the data recorded in the map, and carries out control over the adjustable stage 14A to move the first reflector 14 by the obtained amount of shift of the first reflector 14 in step (2). In this way, the phase of the first beam (one of the two laser beams striking on the recording layer 21) is changed, and the fringe-forming position in the recording layer 21 is shifted in accordance with the contraction of the recording layer 21. Accordingly, the fringe-forming position of the interference fringe pattern S2 to be recorded later after contraction is shifted to a position closer to the position of the interference fringe pattern S1 recorded earlier before contraction, as shown in FIG. 2C. Consequently, in this embodiment, the maximum amount of shift or displacements of the interference fringe pattern S2 recorded after contraction relative to the interference fringe pattern S1 recorded before contraction can be suppressed to the minimum as compared with the case where the apparatus or method according to the conventional embodiment is adopted.

According to the present embodiment, the following advantageous effects can be achieved.

Since the fringe-forming position of the interference fringe pattern S2 can be shifted according as the recording layer 21 contracts, by changing a phase of a laser beam based upon the position of surface position 21a of the recording layer 21, the undesirable displacements of the interference fringes and associated low contrast or blurs of the resulting interference fringe pattern, which would otherwise be expected to appear, can be suppressed effectively.

The present invention is not limited to the above-described exemplary embodiment, and may be carried out into practice in various other ways. Some modifications practicable will now be presented below by way of example.

In the above-described embodiment, laser beams emitted and directed into the recording layer 21 has no information embedded therein. However, the present invention is not limited to this specific embodiment, and the optical recording apparatus 1 may further include a spatial phase modulator or a DMD (digital micromirror device) element provided at an appropriate position on the optical path of one of the two laser beams to embed information in the one of the two laser beams directed into the recording layer 21, so that information as desired may be embedded in the one of the two laser beams directed into the recording layer 21. The optical recording medium 2 incorporating an interference fringe pattern without information embedded therein may be utilized as an optical element such as a polarizing plate. On the other hand, the optical recording medium 2 incorporating an interference fringe pattern with information embedded therein may be utilized as an optical disc.

In the above-described embodiment, the first reflector 14 is shifted to change a phase of a first beam (one of the two laser beams), but the present invention is not limited thereto. An alternative embodiment may be applicable in which the second reflector 16 is provided with an adjustable stage by means of which the second reflector 16 is movable in an optical axis direction. In this alternative embodiment, as well, a phase of one of the two laser beams (second beam) can be shifted to appropriately shift a fringe-forming position in the recording layer 21.

Instead of shifting the position of the first reflector 14 or similar optical elements (mirror, etc.), a variable refractive index element may be used to change a phase of one of the laser beams. The variable refractive index element refers to an element which includes a medium having a variable refractive index which varies according to a voltage applied thereto.

To be more specific, the semitransparent mirrors 13, 15 in the embodiment of FIG. 1 may be substituted with normal mirrors (specular reflectors) 131, 151, while variable refractive index elements 132, 152 are provided between the mirror 131 and the optical recording medium 2 (recording layer 21) and between the mirror 151 and the optical recording medium 2 (recording layer 21), respectively, as shown in FIG. 3. In this embodiment, a controller 191 is configured to regulate a voltage applied to the variable refractive index elements 132, 152 based upon the amount of shift in the surface position of the recording layer 21 provided in the signal produced by the distance sensor 18 and data retrieved from a map stored in a storage device. The map used herein contains data representing a relationship between the amount of shift in the surface position obtained from the distance sensor 18 and the refractive index of each variable refractive index element 132, 152, which is acquired through experiment and/or simulation in advance. It is understood that the mirror 131 and the variable refractive index element 132 make up a first optical system, and the mirror 151 and the variable refractive index element 152 make up a second optical system. With this configuration, when the surface position of the recording layer 21 measured by the distance sensor 18 varies, the controller 191 regulates the voltage applied to each variable refractive index element 132, 152 to change the refractive indices of the variable refractive index elements 132, 152 to different refractive indices n1, n2, respectively, thereby changing the phases of the laser beams so as to shift the fringe-forming position. In this way, even when the fringe-forming position in the recording layer 21 tends to be dislocated due to contraction of the recording layer 21, the fringe-forming position can be adjusted to suppress such dislocation. It is to be understood that two variable refractive index elements provided one in each of the first and second optical systems as in this embodiment of FIG. 3 is not necessarily the only case applicable. The variable refractive index element may be provided in at least one of the first and second optical systems.

In the embodiment illustrated in FIG. 3, the mirrors 131, 151 may not both be required as the case may be. For example, the mirror 131 may be omitted if the variable refractive index element 132 and the optical recording medium 2 are disposed in this order on the optical axis of the laser beam transmitted through the beam splitter 12, and the mirror 151 is oriented to reflect and direct the laser beam toward the optical recording medium 2, and the variable refractive index element 152 is disposed on the optical axis of the laser beam reflected off the mirror 151.

Instead of changing the phase of at least one of the laser beams, the surface position of the recording layer 21 may be moved to shift the fringe-forming position in the recording layer 21. To be more specific, an optical recording apparatus 3 as shown in FIG. 4 may be used to form and record interference fringes. The optical recording apparatus 3 includes a light source 11, a beam splitter 12, a support stage 17 and a distance sensor 18 similar to the corresponding components as shown in FIG. 1. In addition, the optical recording apparatus 3, unlike the optical recording apparatus 1 shown in FIG. 1, further includes: a first mirror 31 configured to reflect a laser beam transmitted through the beam splitter 12 and to direct the same to the optical recording medium 2; a second mirror 32 configured to reflect a laser beam reflected in the beam splitter 12 and to direct the same to the optical recording medium 2; an adjustable stage 17A configured to move the support stage 17 in the direction of contraction of the recording layer 21; and a controller 33 configured to carry out control over the adjustable stage 17A. A map representing a relationship between the amount of shift in the surface position obtained from the distance sensor 18 and the amount of shift of the support stage 17 to be effected by the adjustable stage 17A is acquired through experiment and/or simulation in advance, and stored in a storage device, so that the controller 33 determines the amount of regulation of the adjustable stage 17A from a signal produced by the distance sensor 18 based upon the relationship recorded in the map.

In this embodiment, the light source 11, beam splitter 12, first mirror 31 and second mirror 32 constitute one exemplary arrangement corresponding to an emitter defined in appended claims.

With this optical recording apparatus 3, as the recording layer 21 contracts after the interference fringe pattern S1 is formed and recorded therein, as shown in FIGS. 5A-5C, the signal output from the distance sensor 18 which reflects the shift in the surface position of the recording layer 21 is received by the controller 33 which in turn carries out control over the adjustable stage 17A by acquiring the amount of the shift to be effected of the support stage 17 based upon the amount of shift in the surface position and data obtained from the map. Accordingly, the recording layer 21 is moved in the direction of contraction as shown in FIG. 5C, so that the fringe-forming position of the interference fringe pattern S2 to be recorded later after contraction can be shifted to a position closer to the position of the interference fringe pattern S1 recorded earlier in the recording layer 21 before contraction. Therefore, in this embodiment, the maximum amount of shift or displacements of the interference fringe pattern S2 recorded after contraction relative to the interference fringe pattern S1 recorded before contraction can be suppressed to the minimum as compared with the case where the apparatus or method according to the conventional embodiment is adopted.

The exemplary embodiment shown in FIG. 4 is configured to shift the support stage 17 in the direction of contraction (i.e., thickness direction) of the recording layer 21, but the present invention is not limited to this embodiment. Alternatively, the recording layer 21 in which the interference fringe pattern S1 has been recorded and tilted slightly toward a flat position as shown in FIGS. 6A and 6B may be moved along a straight line extending parallel to the surface of the recording layer 21 (optical recording medium 2) in the plane of incidence of the incident laser beams as shown in FIG. 6C. In this alternative embodiment as well, the maximum amount of shift or displacements of the interference fringe pattern S2 recorded after contraction relative to the interference fringe pattern S1 recorded before contraction can be suppressed to the minimum as compared with the case where the apparatus or method according to the conventional embodiment is adopted.

In the above-described embodiments, the number of laser beams caused to interfere is two by way of example, but the present invention is not limited to these embodiments. It is to be understood that any number of the laser beams which can be caused to strike and interfere in the recording layer 21 will do. In particular, two through four laser beams may preferably be used, because the more the number of laser beams, the more difficult it is to regulate the directions of the respective laser beams so as to concentrate the beams on one fringe-forming position, while one laser beam cannot be caused to interfere. In this respect, normally, two through four of the laser beams may be preferable in terms of simplicity and stability of the optical system. It is to be noted that the number of laser beams used in the collinear recording method should be deemed to be two though the reference and signal beams are directed on one and the same axis into the recording layer.

In the above-described embodiments, the laser beam incident on the first reflector 14 or the second reflector 16 (hereinafter referred to as "incident light") is reflected and directed on the same optical axis as that of the incident light, but the present invention is not limited to these embodiments. For example, at least one of the reflectors 14, 16 may have two specular surfaces that form a right angle with each other to assume a shape of the letter L, so that the reflected incident light may be directed along an optical axis parallel to the optical axis of the incident light but shifted to some extent, as shown in FIG. 7.

In the above-described embodiment, the optical recording medium 2 is composed of a recording layer 21, and a glass substrate 22 which supports the recording layer 21, but the present invention is not limited to these embodiments. For example, as shown in FIG. 8, the recording layer 21 may be held between two glass substrates 22 to form the optical recording medium 2'. In this embodiment shown in FIG. 8, a support stage 172 is disposed to support the outside of one of the glass substrates 22 facing to a surface 21a on which the laser beams strike, and an opening 171 is provided in the center of the support stage 172 to allow the laser beams to enter therethrough into the recording layer 21. It is to be understood that the distance sensor 18 in this embodiment may be configured to measure the position of a surface 21b opposite to the surface 21a (on which the beams strike). It is also to be understood that the surface of which the position is to be measured by the distance sensor 18 may be the surface of the glass substrate 22 which supports the recording layer 21.

The invention claimed is:

1. A method for recording an interference fringe pattern in a recording layer of a medium, comprising:
   causing a plurality of laser beams to interfere so as to form interference fringes in the recording layer; and
   performing, continuously during a time period over which the plurality of laser beams are caused to interfere, the steps of:
   (1) producing a signal varying according to a shift of a specific position in the recording layer; and
   (2) shifting a fringe-forming position in the recording layer by changing a phase of at least one of the laser beams based upon the signal produced in the step (1), wherein the step (1) comprises measuring a surface position of the recording layer, and converting the measurement into the signal.

2. A method for recording an interference fringe pattern in a recording layer of a medium, comprising:
   causing a plurality of laser beams to interfere so as to form interference fringes in the recording layer; and
   performing, continuously during a time period over which the plurality of laser beams are caused to interfere, the steps of:
   (1) producing a signal varying according to a shift of a specific position in the recording layer; and
   (2) shifting a fringe-forming position in the recording layer by changing a phase of at least one of the laser beams based upon the signal produced in the step (1), wherein the step (1) comprises measuring a position in the medium varying according to a shift in a surface position of the recording layer, and converting the measurement into the signal.

3. A method for recording an interference fringe pattern in a recording layer of a medium, comprising:
   causing a plurality of laser beams to interfere so as to form interference fringes in the recording layer; and
   performing, continuously during a time period over which the plurality of laser beams are caused to interfere, the steps of:
   (1) producing a signal varying according to a shift of a specific position in the recording layer; and
   (2) shifting a fringe-forming position in the recording layer by changing a phase of at least one of the laser beams based upon the signal produced in the step (1), wherein the step (1) comprises measuring a position of a surface of a layer of the medium provided over a first surface of the recording layer reverse to a second surface thereof fixed relative to an optical system from which the plurality of laser beams are emitted, and converting the measurement into the signal.

4. An apparatus for recording an interference fringe pattern in a recording layer of a medium, comprising:
   a light source configured to emit a laser beam;
   a beam splitter configured to split the laser beam emitted from the light source into a plurality of laser beams which comprise a first beam and a second beam;
   a first optical system configured to direct the first beam received from the beam splitter into the recording layer by reflecting or transmitting the first beam;
   a second optical system configured to direct the second beam received from the beam splitter into the recording layer by reflecting or transmitting the second beam;
   a position transducer configured to produce a signal varying according to a shift of a specific position in the recording layer; and a controller configured to carry out control over at least one of the first and second optical systems, to change a phase of at least one of the first and second beams based upon the signal produced by the position transducer, thereby shifting a fringe-forming position in the recording layer.

5. The apparatus according to claim 4, wherein the position transducer comprises a sensor configured to measure a surface position of the recording layer.

6. The apparatus according to claim 4, wherein the position transducer comprises a sensor configured to measure a position in the medium varying according to a shift in a surface position of the recording layer.

7. The apparatus according to claim 4, wherein the position transducer comprises a sensor configured to measure a position of a surface of a layer of the medium provided over a first surface of the recording layer reverse to a second surface thereof fixed relative to the apparatus.

8. The apparatus according to claim 4,
wherein the first optical system comprises:
  a first semitransparent mirror configured to transmit the first beam received from the beam splitter; and
  a first reflector configured to reflect the first beam transmitted through the first semitransparent mirror back onto the first semitransparent mirror, thereby causing the first beam to be reflected off a specular surface of the first semitransparent mirror into the recording layer,
wherein the second optical system comprises:
  a second semitransparent mirror configured to transmit the second beam received from the beam splitter; and
  a second reflector configured to reflect the second beam transmitted through the second semitransparent mirror back onto the second semitransparent mirror, thereby causing the second beam to be reflected off a specular surface of the second semitransparent mirror into the recording layer, and
wherein at least one of the first and second optical systems further comprises a shifter by means of which the first or second reflector is movable in an optical axis direction under control of the controller which is configured to regulate the shifter based upon the signal produced by the position transducer to change the phase of at least one of the first and second beams, thereby shifting the fringe-forming position in the recording layer.

9. The apparatus according to claim 4,
wherein at least one of the first and second optical systems comprises a variable refractive index element of which a refractive index is variable according to a voltage applied thereto, and
wherein the controller is configured to regulate the voltage applied to the variable refractive index element based upon the signal produced by the position transducer to change the phase of at least one of the first and second beams, thereby shifting the fringe-forming position in the recording layer.

10. An apparatus for recording an interference fringe pattern in a recording layer of a medium, comprising:
  a support stage configured to support the medium;
  an emitter configured to emit a plurality of laser beams directed into the recording layer;
  a position transducer configured to produce a signal varying according to a shift of a specific position in the recording layer;
  a shifter configured to shift the support stage; and
  a controller configured to carry out control over the shifter to shift the recording layer based upon the signal produced by the position transducer, thereby shifting a fringe-forming position in the recording layer, wherein the position transducer comprises a sensor configured to measure a surface position of the recording layer.

11. An apparatus for recording an interference fringe pattern in a recording layer of a medium, comprising:
  a support stage configured to support the medium;
  an emitter configured to emit a plurality of laser beams directed into the recording layer;
  a position transducer configured to produce a signal varying according to a shift of a specific position in the recording layer;
  a shifter configured to shift the support stage; and
  a controller configured to carry out control over the shifter to shift the recording layer based upon the signal produced by the position transducer, thereby shifting a fringe-forming position in the recording layer, wherein the position transducer comprises a sensor configured to measure a position in the medium varying according to a shift in a surface position of the recording layer.

12. An apparatus for recording an interference fringe pattern in a recording layer of a medium, comprising:
  a support stage configured to support the medium;
  an emitter configured to emit a plurality of laser beams directed into the recording layer;
  a position transducer configured to produce a signal varying according to a shift of a specific position in the recording layer;
  a shifter configured to shift the support stage; and
  a controller configured to carry out control over the shifter to shift the recording layer based upon the signal produced by the position transducer, thereby shifting a fringe-forming position in the recording layer, wherein the position transducer comprises a sensor configured to measure a position of a surface of a layer of the medium provided over a first surface of the recording layer reverse to a second surface thereof fixed relative to the apparatus.

13. A method for manufacturing a medium having a recording layer in which an interference fringe pattern is recorded, comprising:
  causing a plurality of laser beams to interfere so as to form interference fringes in a recording layer; and
  performing, continuously during a time period over which the plurality of laser beams are caused to interfere, the steps of:
    (1) producing a signal varying according to a shift in a specific position in the recording layer; and
    (2) shifting a fringe-forming position in the recording layer by changing a phase of at least one of the laser beams or moving the recording layer based upon the signal produced in the step (1), wherein step (1) comprises one of: a) measuring a surface position of the recording layer, b) measuring a position in the medium varying according to a shift in a surface position of the recording layer, and c) measuring a position of a surface of a layer of the medium provided over a first surface of the recording layer reverse to a second surface thereof fixed relative to an optical system from which the plurality of laser beams are emitted, and converting the measurement from said at least one of a), b) and c) into the signal.

* * * * *